United States Patent
Park et al.

(10) Patent No.: US 7,920,452 B2
(45) Date of Patent: Apr. 5, 2011

(54) RECORDING/REPRODUCING APPARATUS AND METHOD

(75) Inventors: Hyun-soo Park, Seoul (KR); Wook-yeon Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 525 days.

(21) Appl. No.: 11/954,587

(22) Filed: Dec. 12, 2007

(65) Prior Publication Data

US 2008/0165644 A1    Jul. 10, 2008

Related U.S. Application Data

(60) Provisional application No. 60/879,360, filed on Jan. 9, 2007.

(51) Int. Cl.
*G11B 7/00* (2006.01)
(52) U.S. Cl. .................................. 369/59.11
(58) Field of Classification Search .............. None
See application file for complete search history.

(56) References Cited

U.S. PATENT DOCUMENTS

| | | | |
|---|---|---|---|
| 7,492,688 B2 * | 2/2009 | Fujita et al. | 369/59.11 |
| 2005/0018589 A1 * | 1/2005 | Mizushima et al. | 369/275.2 |
| 2005/0207308 A1 * | 9/2005 | Kobayashi et al. | 369/59.11 |
| 2008/0025180 A1 * | 1/2008 | Aoyama et al. | 369/59.12 |

FOREIGN PATENT DOCUMENTS

KR    2006-133297    12/2006

* cited by examiner

*Primary Examiner* — Joseph Haley
(74) *Attorney, Agent, or Firm* — NSIP Law

(57) ABSTRACT

Provided are a recording/reproducing apparatus and method for optimizing data recording. The recording/reproducing apparatus sets a predetermined length which is an integer multiple of a unit recording length and sets a plurality of recording parameters, with reference to mark/space combinations which can be configured within the predetermined length ahead of a start point of a mark for recording data and mark/space combinations which can be configured within the predetermined length behind an end point of the mark for recording data. Accordingly, by setting a predetermined length and limiting conditions for optimizing recording parameters, and considering run-length combinations which can be configured within the predetermined length, it is possible to quickly and efficiently optimize parameters.

12 Claims, 4 Drawing Sheets

MARK START POINT

RECORDING/REPRODUCING APPARATUS AND METHOD

CROSS-REFERENCE TO RELATED APPLICATION

This application claims all benefits accruing under 35 U.S.C. §119 from U.S. Provisional Application No. 60/879,360, filed on Jan. 9, 2007 in the U.S. Patent and Trademark Office, the disclosure of which is incorporated herein by reference.

BACKGROUND OF THE INVENTION

1. Field of the Invention

The present invention relates to a method of recording information in an information storage medium, and more particularly, to a method of recording digital data in an optical disk by forming marks on the optical disk.

2. Description of the Related Art

Optical disks onto which data can be recorded, from which data can be erased, and from which data can be reproduced, include 650 MB capacity CD-R and CD-RW disks, as well as 4.7 GB capacity DVD-RAM, DVD-R, DVD-RW, DVD+R, and DVD+RW disks, etc. Also, high-definition DVD (HD-DVD) disks, Blu-ray disks (BDs), etc. whose recording capacities are above 23 GB, are being developed. When data is recorded in such recordable disks, the data is recorded using a recording pulse signal as illustrated in FIG. 1.

Referring to FIG. 1, if a recording time unit is T and a recording pulse signal corresponds to N times the recording time unit T, the recording pulse signal consists of N-1 recording pulses. Additionally, parameters for constructing the N-1 recording pulses must be optimized. In other words, in an example illustrated in FIG. 1, since the quality of a recording signal waveform that is to be used in the recording of data depends on several parameters, it is necessary to set these parameters to optimal values in order to produce high-quality recordings on the disks. The recording parameters include a power level of a record pattern (Pw), a power level of an erase power (Pe), an offset between the beginning of the mark and the beginning of the record pattern (dTop), a length (a time width) of a top pulse of a pulse train within the record pattern (Ttop), a length (a time width) of each pulse in the multipulse (Tmp), a bias power level (Pb), and an offset between the end of the record pattern and the beginning of the erase pattern (dTe).

In order to optimize these parameters, a method of setting the parameters to different values according to lengths of marks to be recorded is generally used. For example, if the seven parameters to be used in the recording are Pw(n), Pe(n), dTtop(n), Ttop(n), Tmp(n), Pb(n), and dTe(n) when a mark having a length nT (T is a unit length) is recorded, the 7 parameters are optimized according to possible run-length conditions. For example, in the case of a DVD, since run-length conditions are 3 T-11 T and 14 T, optimal parameter values have to be set from parameter values (Pw(3), Pe(3), dTtop(3), Ttop(3), Tmp(3), Pb(3), and dTe(3)) which correspond to the run-length condition of 3 T, to parameter values (Pw(14), Pe(14), dTtop(14), Ttop(14), Tmp(14), Pb(14), and dTe(14)) that correspond to the run-length condition of 14 T. However, for parameter values which correspond to the run-length condition 12 T and 13 T are not set because they are not run-length conditions of the DVD.

A typical set of write strategy condition (WSC(n)) of 7 parameters with respect to nT can be defined as Equation 1 below.

$$WSC(n) = \{Pw(n), Pe(n), dTtop(n), Ttop(n), Tmp(n), Pb(n), dTe(n)\} \quad \text{(Equation 1)}$$

If the number of recording parameters varies, the number of elements of the set WSC(n) will also vary. Recently, a lot of research on methods to optimize the parameters has been conducted. For example, one of the parameter optimization methods has the parameter set WSC(n) defined only in correspondence to run-length conditions. For example, in the case of a CD, since run-length conditions are 3 T-11 T only WSC(3) through WSC(11) are defined. In the case of a DVD, since run-length conditions are 3 T-11 T and 14 T, only WSC(3) through WSC(11) and WSC(14) are defined. Also, in the case of a BD, since run-length conditions are 2 T-9 T, only WSC(2) through WSC(9) are defined.

However, it has been found by experimentation that, when different run-length conditions are set according to not only a mark signal, but to run-lengths of spaces ahead of and behind the mark signal, a signal with higher quality can be obtained as data is recorded according to the different run-length conditions.

In more detail, in the case of a parameter set as WSC(5) for recording a current mark corresponding to 5 T, the parameter values of the WSC(5) are defined as different values, respectively, when a space ahead of the current mark of 5 T has a length of 3 T, 4 T, 5 T, and so on, and are also defined as different values, respectively, when a space behind the current mark of 5 T has a length of 3 T, 4 T, 5 T, and so on. For example, in a BD, in a parameter set WSC(5) for recording a current mark corresponding to 5 T, since a space ahead of the current mark of 5 T can have a length from 2 T to 9 T, 8 cases are possible. Also, since a space behind the current mark of 5 T can have a length from 2 T to 9 T, 8 cases are further possible. Accordingly, a signal waveform of the WSC(5) will be optimized according to a total of 64 (=8×8) cases.

Accordingly, Equation 1 can be rewritten for the BD as Equation 2 below.

$$WSC(nprev, n, nnext) = \quad \text{(Equation 2)}$$
$$\{Pw(nprev, n, nnext), Pe(nprev, n, nnext), Ttop(nprev, n, nnext), Ttop(nprev, n, nnext), Tmp(nprev, n, nnext), Pb(nprev, n, nnext), dTe(nprev, n, nnext)\}.$$

Here, nprev denotes a run-length of a space ahead of a current mark, and nnext denotes a run-length of a space behind the current mark. For example, the case where a space of 3 T exists ahead of a mark of 5 T, and a space of 6 T exists behind the mark of 5 T can be expressed as WSC(3,5,6). In the case of a BD, since both the run-length of a space ahead of a current mark and the run-length of a space behind the current mark can be defined as a length from 2 T to 9 T, the number of cases for recording the current mark becomes 512 (=8×8×8).

As recording density increases, the lengths of marks and spaces that are to be recorded decrease with respect to the diameter of a laser beam. Accordingly, it is necessary to further consider the influences of adjacent signals, such as spaces which are located two or more spaces ahead of and behind a mark that is to be recorded, as well as spaces just ahead of and behind the corresponding mark. Thus, the number of cases to consider in optimizing the signal waveform increases exponentially, and requires much resource to construct a system that can handle the large amount of cases.

SUMMARY OF THE INVENTION

Several aspects and example embodiments of the present invention provide a recording/reproducing apparatus and method of setting a predetermined length corresponding to a recording density as the recording density is increased, and limiting run-length conditions which can be configured within the predetermined length to reduce the number of cases of recording conditions, to thereby record data efficiently using available resources.

Additional aspects and/or advantages of the invention will be set forth in part in the description which follows and, in part, will be obvious from the description, or may be learned by practice of the invention.

According to an example embodiment of the present invention, there is provided a recording/reproducing apparatus including: a writing/reading unit to write or read data to or from an information storage medium; and a control unit to set a predetermined length as an integer multiple of a unit recording length and to set a plurality of recording parameters with reference to mark/space combinations on an information storage medium which can be configured within the predetermined length ahead of a start point of a mark for recording data on the information storage medium and mark/space combinations which can be configured within the predetermined length behind an end point of the mark for recording data on the information storage medium.

According to an example embodiment of the present invention, the predetermined length is obtained based on a diameter of the laser beam decided by wavelength of a laser beam and a Numeral Aperture (NA), and unit lengths of marks/spaces which are within a length of the diameter of the laser beam.

According to an example embodiment of the present invention, the mark/space combinations which can be configured within the predetermined lengths are obtained by extracting signal combinations which satisfy run-length conditions from among signal combinations which can be configured within the predetermined lengths.

According to an example embodiment of the present invention, a number of recording parameters is calculated by (a number of mark/space combinations ahead of the start point of the mark)×(a number of the marks according to run-length conditions)×(a number of mark/space combinations behind the end point of the mark).

According to another example embodiment of the present invention, there is provided a recording/reproducing method including: setting a predetermined length as an integer multiple of a unit recording length and setting a plurality of recording parameters with reference to mark/space combinations on an information storage medium which can be configured within the predetermined length ahead of a start point of a mark for recording data on the information storage medium and mark/space combinations which can be configured within the predetermined length behind an end point of the mark for recording data on the information storage medium; and recording the data on the information storage medium according to the plurality of recording parameters.

According to another example embodiment of the present invention, a recording/reproducing apparatus for recording on an optical disk, includes: a writing/reading unit to write or read data to or from the optical disk; and a control unit to generate a recording signal having a predetermined waveform; and to optimize recording parameters of the recording signal while forming a series of marks on the optical disk based on mark/space combinations that can be configured within a predetermined length ahead of a start point of a mark for recording data on the optical disk and mark/space combinations that can be configured within the predetermined length behind an end point of the mark for recording data on the optical disk.

According to another example embodiment of the present invention, a method of optimizing a signal for recording on an optical disk, includes: generating a recording signal having a predetermined waveform; and optimizing recording parameters of the recording signal while forming a series of marks on the optical disk based on mark/space combinations that can be configured within a predetermined length ahead of a start point of a mark for recording data on the optical disk and mark/space combinations that can be configured within the predetermined length behind an end point of the mark for recording data on the optical disk.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
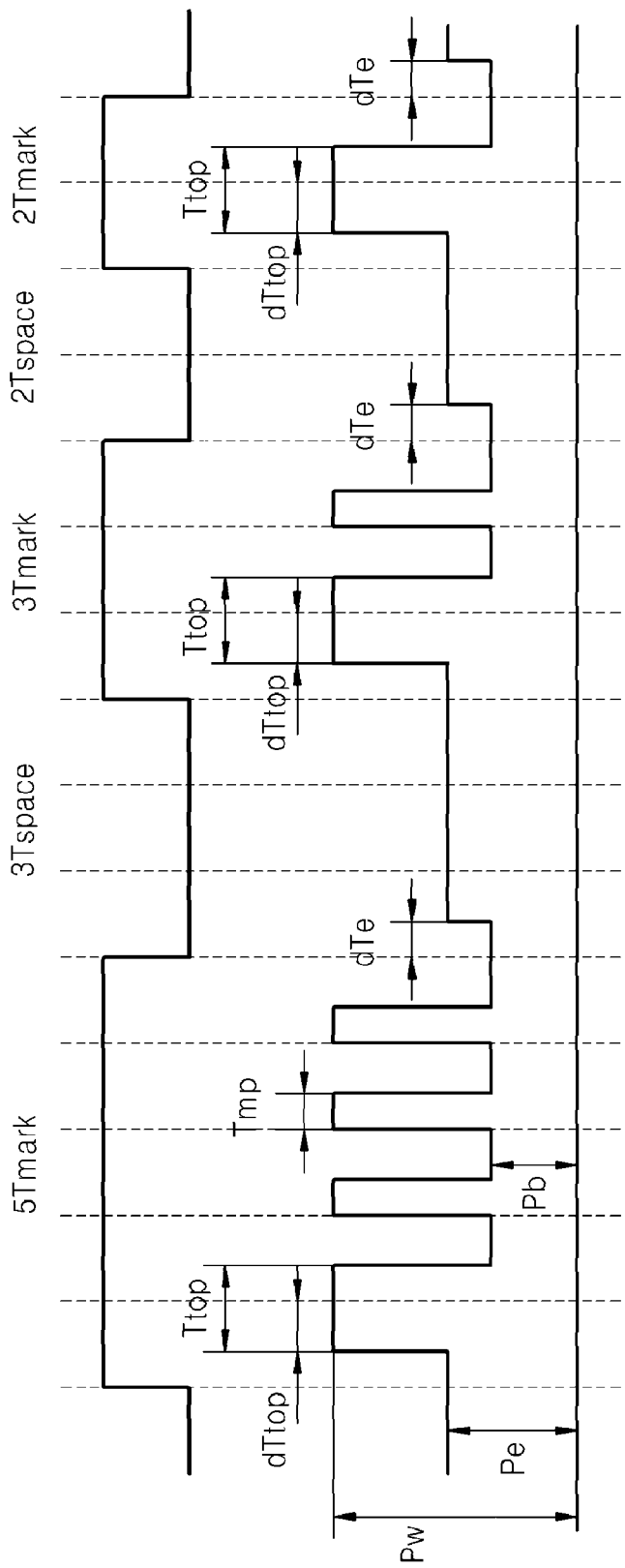
FIG. 1 illustrates a waveform of a recording signal used for recording on an optical disk.

Reference will now be made in detail to example embodiments of the present invention, examples of which are illustrated in the accompanying drawings, wherein like reference numerals refer to the like elements throughout. The example embodiments are described below in order to explain the present invention by referring to the figures.

As described above, in order to obtain an optimal reproducing signal from an optical disk, it is necessary to optimize recording conditions for a current mark by considering spaces located just before and after the current mark that is recorded. When a recording density of the optical disk is very low, it is possible to optimize parameters according to the length of a mark regardless of the spaces that are located just before and after the mark. However, as the recording density of the optical disk increases, recording conditions of the current mark must be optimized by considering the spaces located just before and after the current mark that is recorded.

However, as the recording density of the optical disk becomes higher, an optimal signal quality can be obtained by varying the optimal parameters with respect to the lengths of signals which are located two signals (or spaces) ahead of and two signals (or spaces) behind a current mark that is to be recorded. Furthermore, if the recording density becomes even higher, an optimal signal quality can be obtained by varying the optimal parameters that additionally considers signals which are located three signals (or spaces) ahead of and three signals (or spaces) behind the current mark that is to be recorded. However, if the number of cases increases in this way, the number of signals to be considered will be very great. For example, for the case considering signals located two signals ahead of and behind a mark that is to be recorded, Equation 2 can be rewritten as Equation 3.

$$WSC(nprevprev, nprev, n, nnext, nnextnext) = \\ \{Pw(nprevprev, nprev, n, nnext, nnextnext), \\ Pe(nprevprev, nprev, n, nnext, nnextnext), \\ dTtop(nprevprev, nprev, n, nnext, nnextnext), \\ Ttop(nprevprev, nprev, n, nnext, nnextnext), \\ Tmp(nprevprev, nprev, n, nnext, nnextnext), \\ Pb(nprevprev, nprev, n, nnext, nnextnext), \\ dTe(nprevprev, nprev, n, nnext, nnextnext)\}.$$

(Equation 3)

In the case of a Blu-Ray Disc (BD), since the number of possible run-lengths for each step (or run-length condition), i.e., for nprevprev, nprev, n, nnext, and nnextnext is 8, the parameters for each of 32768 (=8×8×8×8×8) cases must be set when a number for all cases is considered for optimization, typically. That is, 8 cases are possible for nprevprev, 8 cases are possible for nprev, 8 cases are possible for n, 8 cases are possible for nnext, and 8 cases are possible for nnextnext. In a similar manner, if signals, which are from spaces located three signals ahead of and three signals behind a signal that is to be recorded are considered, optimal parameters can be set when a total of 2097152 (=8×8×8×8×8×8×8) cases is considered.

In general, in order to optimize such parameters, characteristics from input signals need to be extracted and updated so that optimal values could be obtained. Accordingly, if the number of cases is great, a large amount of memory is required and the time required to update the characteristics would be too long. In order to resolve such problems, a method according to an example embodiment of the present invention advantageously seeks to limit a length (or spaces) to those within a predetermined length ahead of and behind a mark and considers only code conditions corresponding to the predetermined length, so as to reduce the number of cases to consider for parameter optimization.

The reason for limiting the length to a predetermined length is due to the fact that a waveform read from an actual disk is limited by the lengths of marks and spaces which are within the diameter of a laser beam that is irradiated on an optical disk, as will be described below.

Figure 2A:
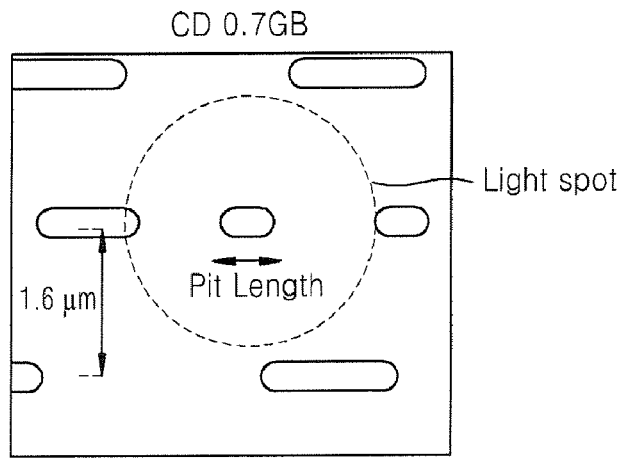
FIGS. 2A, 2B, and 2C are views showing various relationships between a diameter of a laser beam and a mark/space (or a pit) on an optical disk.
Figure 2B:
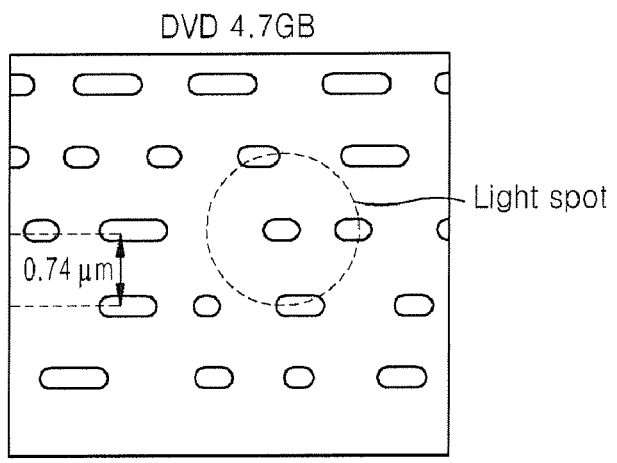
Figure 2C:
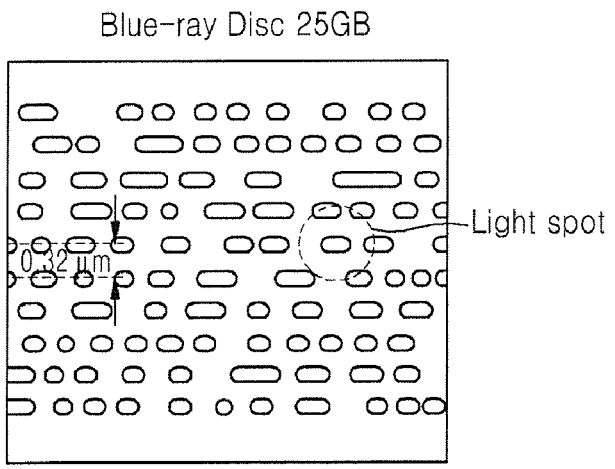

FIGS. 2A, 2B, and 2C are views showing various relationships between a diameter of a laser beam and a mark/space (or a pit) on an optical disk. For example, FIG. 2A shows the relationship between a laser beam and mark/space on a CD. FIG. 2B shows the relationship between a laser beam and mark/space on a DVD. FIG. 2C shows the relationship between a laser beam and mark/space on a BD. Referring to FIGS. 2A, 2B, and 2C, an output signal depends on the combinations of mark/space (also, referred to as "pit" in a ROM type disk) signals which are within the diameter of a laser beam (or a light spot).

Figure 3:
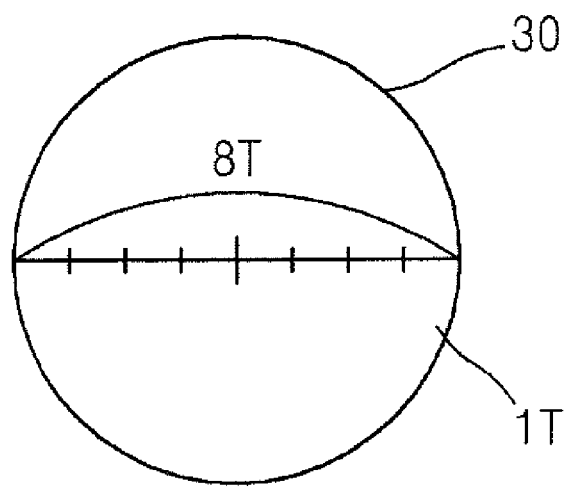
FIG. 3 is a view of a diameter of a laser beam that is eight (8) times a unit recording length.

FIG. 3 is a view of a diameter of a laser beam that is eight (8) times a unit recording length. For example, if the diameter of a laser beam 30 is 8 times a unit recording length (1 T), since the number of cases corresponding to all mark/space combinations which can be configured within the diameter of the laser beam 30 is equal to the number of binary numbers that can be represented with 8 bits, a total of 256 output signals are possible. In this case, if a limitation condition for run-lengths is set (or determined), the number of cases can be significantly reduced. For example, in the case of a (1,7) code used for a BD, since 2 T is a minimum run-length, cases corresponding to 1 T can be excluded.

Figure 4:
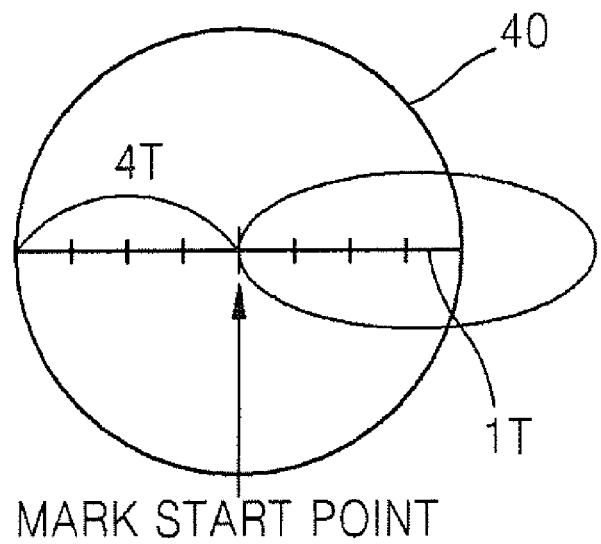
FIG. 4 is a view in which a mark start point is positioned in the center of a laser beam where a diameter of the laser beam is eight (8) times the unit recording length.

FIG. 4 is a view in which a mark start point is positioned in the center of a laser beam 40 and a diameter of the laser beam 40 is eight (8) times a unit recording length (1 T). With regard to a mark that is to be recorded, a case in which a start point of the mark is positioned in the center of the laser beam in FIG. 4. Referring to FIG. 4, an output signal at the start point of the mark depends on four signals (corresponding to spaces that are) after the start of the mark and four signals (corresponding to spaces that are) before the start of the mark.

That is, when the start point of the mark is positioned in the center of the laser beam, a reproduction signal of the mark is started. For example, in the case of the (1,7) code used for the BD, since 2 T is a minimum run length, mark/space combinations which can be configured within a length of 4 T before the start point of the mark to be recorded are listed in Table 1, below.

TABLE 1 space equal to or longer than 4T
mark equal to or longer than 2T + space of 3T
mark of 2T + space of 2T
mark longer than 2T + space of 2T The above four cases are all of the possible cases. In the first case, the reason that a space equal to or longer than 4 T corresponds to just one case is because a space that is longer than 4 T is recognized to be the same signal as a space that is equal to 4 T when seen from the mark start point. That is, assuming that the laser beam 45 has a diameter of 8 T, the laser beam 45 that generates a signal extends only to a space that is equal to 4 T from the mark start point. Accordingly, besides the mark/space combinations listed in Table 1, there are no other mark/space combinations which can be configured within the length of 4 T.

Likewise, in the case of the BD using the (1,7) code, when recording of a mark is terminated, mark/space combinations which can be configured within the length of 4 T after an end point of the mark are listed in Table 2 below.

TABLE 2

1) space equal to or longer than 4T
2) space of 3T + mark equal to or longer than 2T
3) space of 2T + mark of 2T
4) space of 2T + mark longer than 2T The above cases are all of the possible cases. Accordingly, parameter optimization based on the diameter of a laser beam is performed, considering only 128 cases when the diameter of the laser beam is 8 T. The 128 cases are obtained by 4 (a number of cases according to Table 1)×8 (a number of cases corresponding to the length (8 T) of a mark to be recorded)×4 (a number of cases according to Table 2). In other example embodiments, the diameter of a laser beam may be other than 8 T. Accordingly, a number of cases depending on the diameter of the laser beam would differ. For example, a smaller diameter may result in a smaller number of cases to consider.

For comparison, in a typical method, since parameter optimization is performed considering signals which are located two signals ahead of and two signals behind a mark that is to be recorded, 32768 cases must be considered, if the diameter of the laser beam is 8 T. Therefore, according to the present invention, the number of cases that will be considered is reduced from 32768 to 128.

Figure 5:
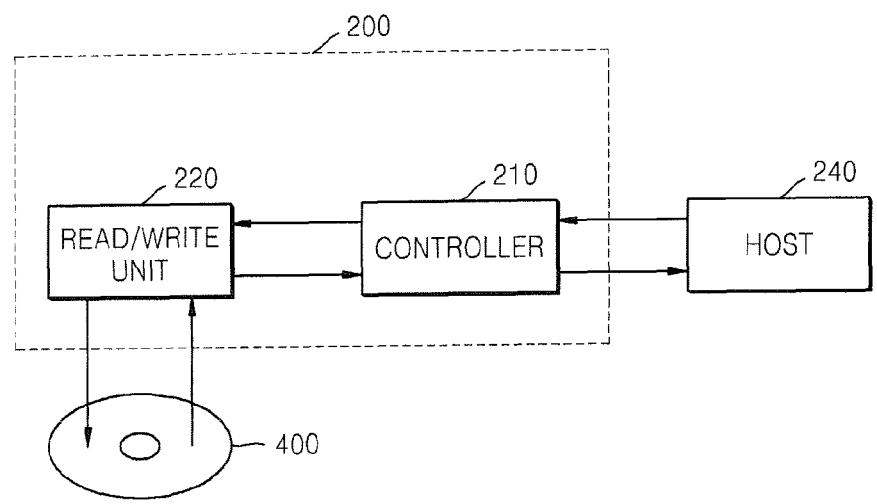
FIG. 5 is a block diagram of a recording/reproducing apparatus according to an example embodiment of the present invention.

FIG. 5 is a block diagram of a recording/reproducing apparatus 200 according to example embodiments of the present invention. Referring to FIG. 5, the recording/reproducing apparatus 200 records data in or reproduces data from a disk 400, and includes a read/write unit 220 and a controller 210. The read/write unit 220 records data in the disk 400, which is an information storage medium, and reads data from the disk to reproduce the data, under the control of the controller 210. The controller 210 controls the read/write unit 220 so that the read/write unit 220 records data in units of predetermined write unit blocks or processes the data read by the read/write unit 220 to obtain valid data.

In particular, the controller 210 sets a predetermined length which is an integer number of times (or an integer multiple of) a unit recording length and determines and stores recording parameters to record data on the disk 400 while considering mark/space combinations which can be configured within the predetermined length ahead of and the predetermined length behind a mark for recording data, and records the data on the disk 400 according to the recording parameters.

Figure 6:
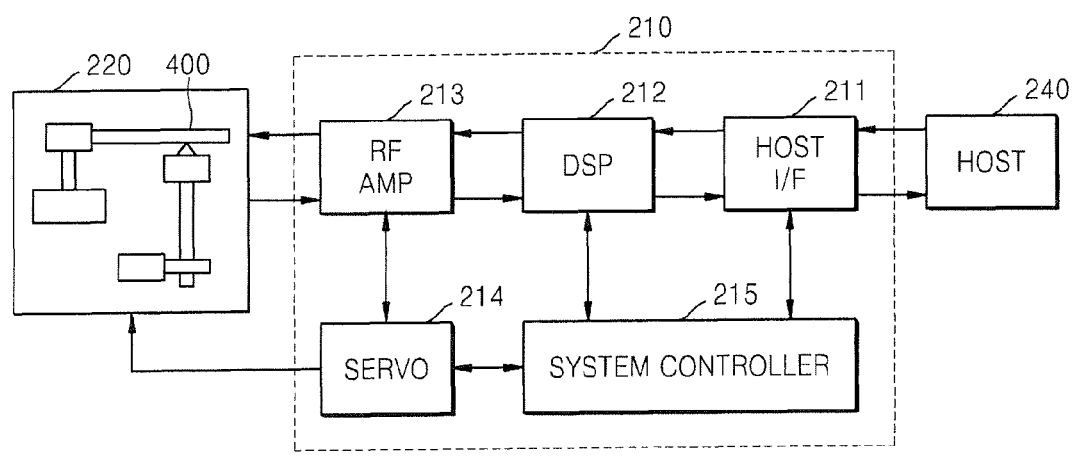
FIG. 6 is a detailed block diagram of the recording/reproducing apparatus of FIG. 5.

FIG. 6 is a detailed block diagram of the recording/reproducing apparatus 200 illustrated in FIG. 5. Referring to FIG. 6, a disk drive includes a pick-up unit 220 which is used as the read/write unit 220. The disk 400 is installed in the pick-up unit 220. Also, the disk drive corresponds to the controller 210, and includes a host I/F 211, a digital signal processor (DSP) 212, a radio-frequency amplifier (RF AMP) 213, a servo 214, and a system controller 215.

The host I/F 211 receives a data write command from the host 240, and transmits the data write command to the system controller 215. The system controller 215 performs initialization for data recording, in response to the data write command. The system controller 215 sets a predetermined length which is an integer number of times a unit recording length and decides recording parameters, considering mark/space combinations which can be configured within the predetermined length ahead of and the predetermined length behind the mark for recording data.

Here, the predetermined length is obtained based on the diameter of the laser beam in view of a wavelength of a laser beam and Numeral Aperture (NA), and the unit lengths of marks/spaces which are within the diameter of the laser beam. Also, the mark/space combinations, which can be configured within the predetermined length, are obtained by extracting signal combinations which satisfy run-length conditions from among signal combinations which can be configured within the predetermined length. The system controller 215 sets the number of recording conditions to a number of cases calculated via (a number of mark/space combinations ahead of a mark)×(a number of the marks according to run-length conditions)×(a number of mark/space combinations behind the mark). In the example illustrated in FIG. 4, the number of recording conditions is set to 128.

Then, the system controller 215 measures jitter values while changing parameters included in each recording condition, and determines a set of parameters providing an optimal jitter value. Parameter sets corresponding to the number of recording conditions are stored in a memory (not shown). The process of determining and storing the parameter sets (before the data is recorded) can vary according to a policy used in the corresponding recording/reproducing apparatus. For example, the process of determining the parameter sets can be performed once after a disk is formatted, can be performed whenever data is recorded, or can be performed to enhance recording quality while data is recorded. Also, the system controller 215 controls the read/write unit 220 so that the read/write unit 220 selects an appropriate parameter set based on a recording pattern of data when the data is recorded, and records the data according to recording parameters included in the parameter set.

The DSP 212 receives data that is to be recorded from the host I/F 211, adds additional data, such as parity, etc., to the data for error correction of the data, performs error correction coding (ECC) on the resultant data to generate an ECC block, which is an error-corrected block, and modulates the ECC block according to a predetermined method. The RF AMP 213 receives the resultant data from the DSP 212 and converts the data into an RF signal. The pick-up unit 220 receives the RF signal from the RF AMP 213 and records the RF signal in the disk 230. The servo 214 receives a command for servo control from the system controller 215 and controls the pick-up unit 220 according to the command.

When data is reproduced, the host I/F 211 receives a read command from the host 240, and the system controller 215 performs initialization for reproduction. The pick-up unit 220 irradiates a laser beam to the disk 400, and outputs light reflected from the disk 400 as a light signal. The RF AMP 213 converts the light signal received from the pick-up unit 220 into an RF signal, and provides modulated data obtained from the RF signal to the DSP 212 and provides a servo obtained from the RF signal to the servo 214. The DSP 212 demodulates the modulated data, performs ECC on the demodulated data, and outputs the resultant data.

Meanwhile, the servo 214 receives the servo signal from the RF AMP 213 and the command for servo control from the system controller 215, and controls the pick-up unit 220. The host I/F 211 sends the data received from the DSP 212 to the host 240.

A recording method according to the present invention is described below. A controller of a recording/reproducing apparatus sets a predetermined length which is an integer number of times (or an integer multiple of) a unit recording length and determines recording parameters, considering mark/space combinations which can be configured within the predetermined length ahead of and/or the predetermined length behind a mark for recording data. Then, the controller selects recording parameter sets suitable for the pattern of the data that is to be recorded, from among the recording parameters, and records the data in a disk according to recording parameter sets.

The example embodiments of the present invention can also be embodied as computer readable codes on a computer readable recording medium. The computer readable recording medium is any data storage device that can store data or the codes which can be thereafter read by a computer system for it to perform operations of the various example embodiments of the invention. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As described above, according to example embodiments of the present invention, by setting a predetermined length corresponding to a recording density when the recording density is high, and limiting run-length conditions which can be configured within the predetermined length to reduce the number of cases of recording conditions, it is possible to quickly optimize parameters and efficiently use resources.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, in other example embodiments, the diameter of a laser beam may be other than 8 T. Accordingly, a number of cases depending on the diameter of the laser beam would differ. For example, a smaller diameter may result in a smaller number of cases to consider. Accordingly, it is intended, therefore, that the present invention not be limited to the various example embodiments disclosed, but that the present invention includes all embodiments falling within the scope of the appended claims.

What is claimed is:

1. A recording/reproducing apparatus, comprising:
a writing/reading unit configured to write or read data to or from an information storage medium; and
a control unit configured to:
set a predetermined length as an integer multiple of a unit recording length; and
set a plurality of recording parameters with reference to:
mark/space combinations on an information storage medium which can be configured within the predetermined length ahead of a start point of a mark for recording data on the information storage medium; and
mark/space combinations which can be configured within the predetermined length behind an end point of the mark for recording data on the information storage medium,
wherein the predetermined length is determined based on a diameter of the laser beam, and
wherein the predetermined length is within a radius of a light spot used to record the mark on the optical disk.

2. The recording/reproducing apparatus of claim 1, wherein the predetermined length is determined based on:
a diameter of the laser beam in view of a wavelength of a laser beam and a Numeral Aperture (NA); and
unit lengths of marks/spaces which are within a length of the diameter of the laser beam.

3. The recording/reproducing apparatus of claim 1, wherein the mark/space combinations which can be configured within the predetermined lengths are obtained by extracting signal combinations which satisfy run-length conditions from among signal combinations which can be configured within the predetermined lengths.

4. The recording/reproducing apparatus of claim 3, wherein a number of recording parameters is calculated by (a number of mark/space combinations ahead of the start point of the mark)×(a number of the marks according to run-length conditions)×(a number of mark/space combinations behind the end point of the mark).

5. A recording/reproducing method, comprising:
setting a predetermined length as an integer multiple of a unit recording length;
setting a plurality of recording parameters with reference to:
mark/space combinations on an information storage medium which can be configured within the predetermined length ahead of a start point of a mark for recording data on the information storage medium; and
mark/space combinations which can be configured within the predetermined length behind an end point of the mark for recording data on the information storage medium; and
recording the data on the information storage medium according to the plurality of recording parameters,
wherein the predetermined length is determined based on a diameter of the laser beam, and
wherein the predetermined length is within a radius of a light spot used to record the mark on the optical disk.

6. The recording/reproducing method of claim 5, wherein the predetermined length is determined based on:
a diameter of the laser beam in view of a wavelength of a laser beam and a Numeral Aperture (NA); and
unit lengths of marks/spaces which are within a length of the diameter of the laser beam.

7. The recording/reproducing method of claim 5, wherein the mark/space combinations which can be configured within the predetermined lengths are obtained by extracting signal combinations which satisfy run-length conditions from among signal combinations which can be configured within the predetermined lengths.

8. The recording/reproducing method of claim 7, wherein a number of recording parameters is calculated by (a number of mark/space combinations ahead of the start point of the mark)×(a number of marks according to run-length conditions)×(a number of mark/space combinations behind the end point of the mark).

9. A method of optimizing a signal for recording on an optical disk, the method comprising:
generating a recording signal having a predetermined waveform; and
optimizing recording parameters of the recording signal while forming a series of marks on the optical disk based on:
mark/space combinations that can be configured within a predetermined length ahead of a start point of a mark for recording data on the optical disk; and
mark/space combinations that can be configured within the predetermined length behind an end point of the mark for recording data on the optical disk,
wherein the predetermined length is within a radius of a light spot used to record the mark on the optical disk.

10. The method of claim 9, wherein the predetermined length is an integer multiple of a unit recording length.

11. A recording/reproducing apparatus for recording on an optical disk, the apparatus comprising:
a writing/reading unit configured to write or read data to or from the optical disk; and a control unit configured to:

generate a recording signal having a predetermined waveform; and optimize recording parameters of the recording signal while forming a series of marks on the optical disk based on:

mark/space combinations that can be configured within a predetermined length ahead of a start point of a mark for recording data on the optical disk; and mark/space combinations that can be configured within the predetermined length behind an end point of the mark for recording data on the optical disk, wherein the predetermined length is within a radius of a light spot used to record the mark on the optical disk.

12. The apparatus of claim 11, wherein the predetermined length is an integer multiple of a unit recording length.

* * * * *